United States Patent
Matsumoto

(10) Patent No.: US 12,334,770 B2
(45) Date of Patent: Jun. 17, 2025

(54) UNINTERRUPTIBLE POWER SUPPLY

(71) Applicant: TOSHIBA MITSUBISHI-ELECTRIC INDUSTRIAL SYSTEMS CORPORATION, Chuo-ku (JP)

(72) Inventor: Jun Matsumoto, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 64 days.

(21) Appl. No.: 18/041,091

(22) PCT Filed: Jun. 16, 2021

(86) PCT No.: PCT/JP2021/022819
§ 371 (c)(1),
(2) Date: Feb. 9, 2023

(87) PCT Pub. No.: WO2022/264303
PCT Pub. Date: Dec. 22, 2022

(65) Prior Publication Data
US 2023/0307942 A1    Sep. 28, 2023

(51) Int. Cl.
*H02J 9/06* (2006.01)
*H02J 3/32* (2006.01)

(52) U.S. Cl.
CPC . *H02J 9/06* (2013.01); *H02J 3/32* (2013.01)

(58) Field of Classification Search
CPC ................. H02J 9/04–08; H02J 3/32–322
See application file for complete search history.

(56) References Cited

U.S. PATENT DOCUMENTS

2010/0213763 A1* 8/2010 Boss .................. H02J 9/06
307/29
2011/0245987 A1* 10/2011 Pratt .................. H02J 7/0068
320/132
(Continued)

FOREIGN PATENT DOCUMENTS

JP    2004-236469 A    8/2004
JP    2019-161939 A    9/2019
WO   WO-2019180784 A1 *  9/2019 ............... H02J 3/32

OTHER PUBLICATIONS

International Search Report mailed on Aug. 17, 2021 in PCT/JP2021/022819 filed on Jun. 16, 2021 (2 pages).
(Continued)

*Primary Examiner* — Rexford N Barnie
*Assistant Examiner* — David A Shiao
(74) *Attorney, Agent, or Firm* — Oblon, McClelland, Maier & Neustadt, L.L.P.

(57) ABSTRACT

A bidirectional chopper selectively performs a charging operation and a discharging operation, the charging operation being an operation in which a part of DC power generated by a converter is stored in a power storage device, the discharging operation being an operation in which DC power of the power storage device is supplied to an inverter. A control circuit controls the bidirectional chopper to perform the discharging operation when a power failure of a power system occurs. The control circuit controls the bidirectional chopper based on a system frequency detected by a frequency detector when the power system is normal. The control circuit controls the bidirectional chopper to perform the charging operation in response to an increase in the system frequency, and to perform the discharging operation in response to a decrease in the system frequency.

6 Claims, 13 Drawing Sheets

(56) References Cited

U.S. PATENT DOCUMENTS

| | | | |
|---|---|---|---|
| 2017/0163089 A1* | 6/2017 | Van Zeyl | H01M 10/425 |
| 2017/0179722 A1* | 6/2017 | Porter | H02J 3/32 |
| 2021/0091595 A1* | 3/2021 | Wilder | H02J 3/466 |
| 2021/0098991 A1* | 4/2021 | Nishimura | H02J 9/061 |
| 2023/0080777 A1* | 3/2023 | Frenger | H02J 7/0013 |
| | | | 307/66 |

OTHER PUBLICATIONS

Office Action dated Apr. 1, 2025, issued in counterpart KR Application No. 10-2023-7004689, with English Translation, (9 pages).

* cited by examiner

UNINTERRUPTIBLE POWER SUPPLY

TECHNICAL FIELD

The present disclosure relates to an uninterruptible power supply.

BACKGROUND ART

In recent years, the capacity of an uninterruptible power supply has been increased in order to continue the operation of a large-scale data center. In a large-capacity uninterruptible power supply, a large-capacity power storage device is used as a backup power supply for power failure compensation. A large-capacity lithium ion battery is, for example, used as such a power storage device.

In contrast, in a power system to which an uninterruptible power supply is connected, many distributed power supplies represented by photovoltaic power generation devices are connected under the situation in which renewable energy has been introduced in recent years (refer to, for example, Japanese Patent Laying-Open No. 2019-161939 (PTL 1)).

CITATION LIST

Patent Literature

PTL 1: Japanese Patent Laying-Open No. 2019-161939

SUMMARY OF INVENTION

Technical Problem

In a power system, when the generated power and the demanded power (load-consumed power) are kept in balance, a system frequency is maintained constant. When an imbalance between the generated power and the demanded power occurs, the system frequency fluctuates. The fluctuations in the system frequency may not only affect the operation of electrical devices of consumers, but also cause a power failure of the power system.

An output of a distributed power supply depends largely on environmental factors such as a climate condition, a time slot and a season. Therefore, it is concerned that as an introduction ratio of the distributed power supplies into the power system becomes higher, the generated power fluctuates more greatly, which leads to greater fluctuations in the system frequency.

The above-described uninterruptible power supply is configured to use DC power stored in the power storage device for power failure compensation in the power system. Therefore, the DC power of the power storage device is not used when the power system is normal, and thus, it is hard to say that the large-capacity power storage device is utilized.

The present disclosure has been made to solve the above-described problem, and an object of the present disclosure is to provide an uninterruptible power supply capable of compensating for frequency fluctuations of a power system.

Solution to Problem

An uninterruptible power supply according to an aspect of the present disclosure includes: a power conversion device connected between a power system and a load; a frequency detector that detects a system frequency, the system frequency being a frequency of an AC voltage on the power system; and a controller that controls the power conversion device. The power conversion device includes: a converter; an inverter; and a bidirectional chopper. The converter converts AC power supplied from the power system into DC power. The inverter converts DC power supplied from the converter or a power storage device into AC power and supplies the AC power to the load. The bidirectional chopper selectively performs a charging operation and a discharging operation, the charging operation being an operation in which a part of the DC power generated by the converter is stored in the power storage device, the discharging operation being an operation in which the DC power of the power storage device is supplied to the inverter. The controller includes a control circuit that controls the bidirectional chopper. The control circuit controls the bidirectional chopper to perform the discharging operation when a power failure of the power system occurs. The control circuit controls the bidirectional chopper based on the detected system frequency when the power system is normal. The control circuit controls the bidirectional chopper to perform the charging operation in response to an increase in the system frequency, and to perform the discharging operation in response to a decrease in the system frequency.

Advantageous Effects of Invention

According to the present disclosure, there can be provided an uninterruptible power supply capable of compensating for frequency fluctuations of a power system.

DESCRIPTION OF EMBODIMENTS

Figure 1:
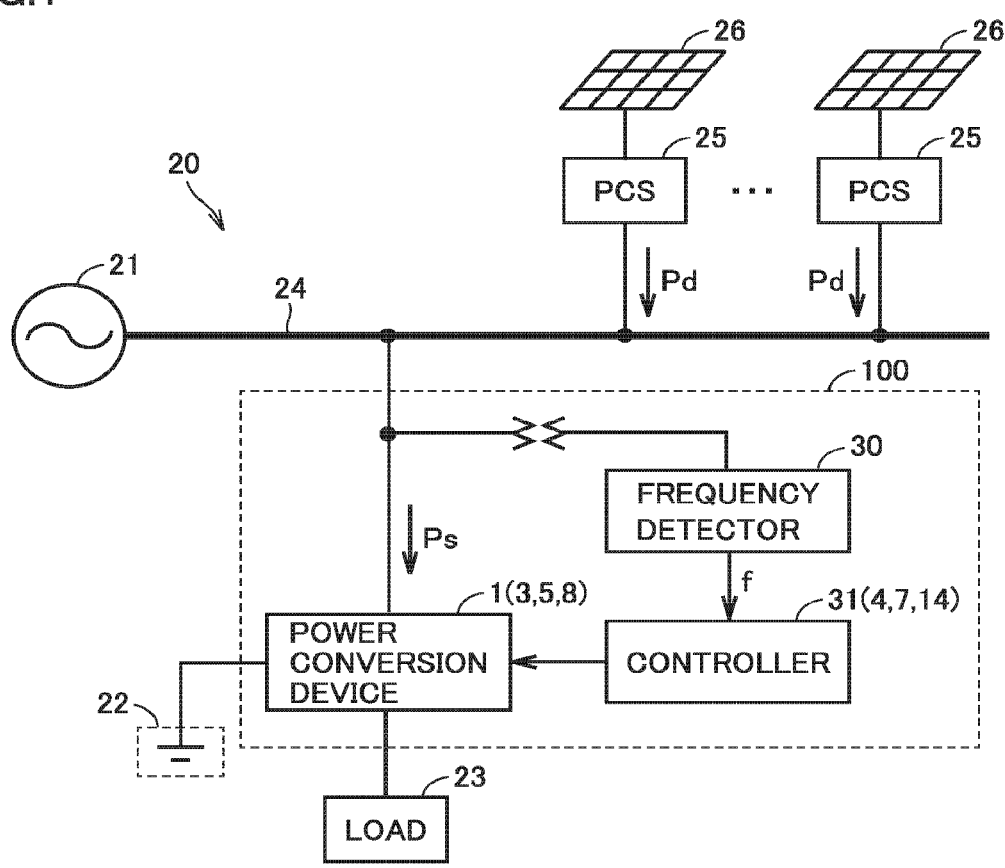
FIG. 1 shows a configuration example of a power system to which an uninterruptible power supply according to the present embodiment is applied.

An embodiment of the present disclosure will be described in detail hereinafter with reference to the drawings. In the following description, the same or corresponding portions in the drawings are denoted by the same reference characters and description thereof will not be repeated in principle.

FIG. 1 shows a configuration example of a power system to which an uninterruptible power supply (UPS) according to the present embodiment is applied.

As shown in FIG. 1, an UPS 100 according to the present embodiment is connected to a power system 20 including a commercial AC power supply 21 and a power transmission line 24. Power conditioners (PCSs) 25 for system interconnection of distributed power supplies 26 are connected to power transmission line 24.

Each distributed power supply 26 converts natural energy into DC power. The natural energy is, for example, sunlight, wind power, tidal power, geothermal heat or the like, and is also called "renewable energy". Each PCS 25 operates in synchronization with an AC voltage of power transmission line 24, and converts the DC power generated by distributed power supply 26 into AC power Pd and supplies AC power Pd to power transmission line 24.

UPS 100 is connected between power transmission line 24 and a load 23, and is driven by AC power of a system frequency f supplied from power system 20. UPS 100 includes a power conversion device 1, a controller 31 and a frequency detector 30.

Power conversion device 1 is controlled by controller 31. When the AC power is normally supplied from power system 20 (when power system 20 is normal), power conversion device 1 generates the AC power of system frequency f using AC power Ps supplied from power system 20, and supplies the AC power to load 23. Furthermore, power conversion device 1 converts a part of AC power Ps into DC power and supplies the DC power to a battery 22.

When a power failure of power system 20 occurs, power conversion device 1 converts the DC power of battery 22 into the AC power of system frequency f and supplies the AC power to load 23. Battery 22 corresponds to an example of "power storage device". A lithium ion battery is, for example, used as battery 22.

Frequency detector 30 detects, from an AC voltage waveform on power transmission line 24, system frequency f that is a frequency of the voltage, and provides a signal indicating the detected value to controller 31.

Figure 2:
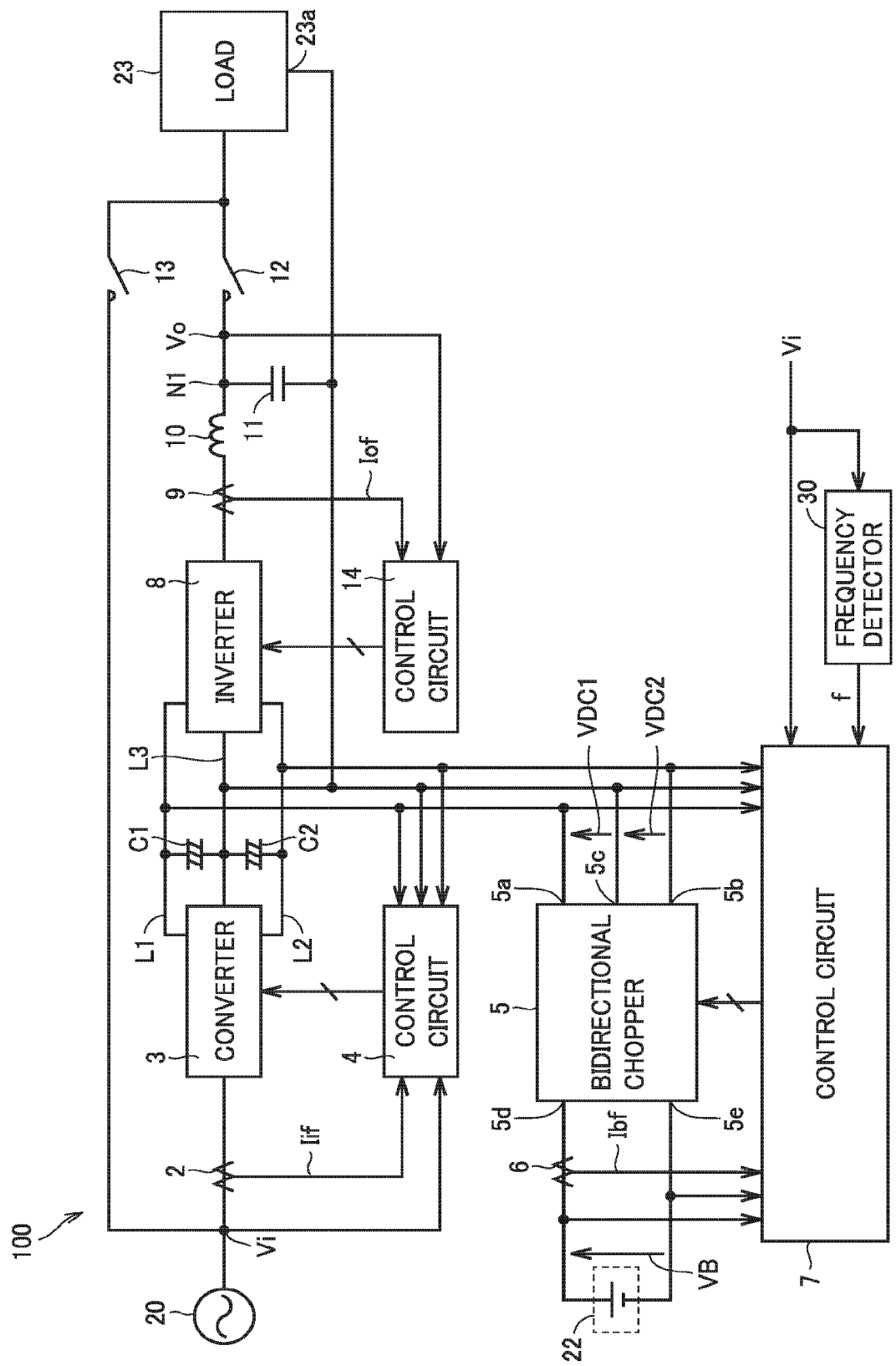
FIG. 2 is a circuit block diagram showing a configuration example of the uninterruptible power supply according to the present embodiment.

FIG. 2 is a circuit block diagram showing a configuration example of UPS 100 according to the present embodiment.

As shown in FIG. 2, UPS 100 includes current detectors 2, 6 and 9, a converter 3, DC lines L1 to L3, capacitors C1, C2 and 11, control circuits 4, 7 and 14, a bidirectional chopper 5, an inverter 8, a reactor 10, and electromagnetic contactors 12 and 13. Converter 3, DC lines L1 to L3, capacitors C1, C2 and 11, bidirectional chopper 5, inverter 8, reactor 10, and electromagnetic contactors 12 and 13 form power conversion device 1 (FIG. 1). Control circuits 4, 7 and 14 form controller 31 (FIG. 1).

UPS 100 is driven by the AC power of system frequency f supplied from power system 20. An instantaneous value of an AC input voltage Vi supplied from power system 20 is detected by control circuits 4 and 7. Current detector 2 detects an AC input current Ii flowing from power system 20 to converter 3, and provides a signal Iif indicating the detected value to control circuit 4.

Converter 3 is controlled by control circuit 4. When power system 20 is normal, converter 3 converts the AC power into DC power and outputs the DC power to DC lines L1, L2 and L3. When supply of the AC power from power system 20 is stopped (when a power failure of power system 20 occurs), an operation of converter 3 is stopped.

When power system 20 is normal, converter 3 generates three-level DC voltages Vdc1, Vdc2 and Vdc3 based on AC voltage Vi supplied from power system 20, and outputs DC voltages Vdc1 to Vdc3 to DC lines L1 to L3, respectively. DC voltage Vdc1 is a positive voltage, DC voltage Vdc2 is a negative voltage, and DC voltage Vdc3 is a ground voltage (0 V). VDC1=Vdc1−Vdc3, VDC2=Vdc3−Vdc2, and VDC1=VDC2. Assuming that Vdc1−Vdc2=VDC, VDC1+VDC2=VDC.

Capacitor C1 is connected between DC lines L1 and L3, to smooth DC voltage VDC1 between DC lines L1 and L3. Capacitor C2 is connected between DC lines L3 and L2, to smooth DC voltage VDC2 between DC lines L2 and L3. An instantaneous value of DC voltage VDC between DC lines L1 and L2 is detected by control circuit 4.

Control circuit 4 detects whether or not a power failure of power system 20 has occurred, based on a detected value of AC input voltage Vi. When power system 20 is normal, control circuit 4 controls converter 3 such that DC voltage VDC becomes equal to a predetermined reference DC voltage VDCr (e.g., 660 V), based on AC input voltage Vi, AC input current Ii and DC voltage VDC. When a power failure of power system 20 occurs, control circuit 4 stops the operation of converter 3.

DC lines L1, L2 and L3 are connected to inverter 8, and are connected to high-voltage-side nodes 5a, 5b and 5c of bidirectional chopper 5, respectively. Low-voltage-side nodes 5d and 5e of bidirectional chopper 5 are connected to a positive electrode and a negative electrode of battery 22, respectively. Battery 22 stores DC power.

Bidirectional chopper 5 is controlled by control circuit 7. When power system 20 is normal, bidirectional chopper 5 stores the DC power generated by converter 3 in battery 22. When a power failure of power system 20 occurs, bidirectional chopper 5 supplies the DC power of battery 22 to inverter 8 through DC lines L1 to L3. Bidirectional chopper 5 is configured to be capable of selectively performing a charging operation in which the DC power is stored in battery 22 and a discharging operation in which the DC power of battery 22 is supplied to inverter 8.

An instantaneous value of DC voltage VDC between DC lines L1 and L3 is detected by control circuit 7. The instantaneous value of DC voltage VDC between DC lines L1 and L2 may be obtained by adding an instantaneous value of DC voltage VDC1 between DC lines L1 and L3 and an instantaneous value of DC voltage VDC2 between DC lines L3 and L2.

Current detector 6 detects a DC current Ib flowing between low-voltage-side node 5d of bidirectional chopper 5 and the positive electrode of battery 22, and provides a signal Ibf indicating the detected value to control circuit 7. An instantaneous value of an inter-terminal voltage (hereinafter, also referred to as "battery voltage") VB of battery 22 is detected by control circuit 7.

Control circuit 7 controls bidirectional chopper 5 based on DC voltage VDC, DC current Ib, battery voltage VB, and system frequency f. Control circuit 7 detects whether or not a power failure of power system 20 has occurred, based on the detected value of AC input voltage Vi.

When power system 20 is normal, control circuit 7 controls bidirectional chopper 5 such that the DC power generated by converter 3 is stored in battery 22 and battery voltage VB becomes equal to a predetermined reference DC voltage VBr (e.g., 480 V). In addition, in response to the occurrence of a power failure of power system 20, control circuit 7 controls bidirectional chopper 5 such that the DC power of battery 22 is supplied to inverter 8 and DC voltage VDC between DC lines L1 and L2 becomes equal to predetermined reference DC voltage VDCr (e.g., 660 V).

Inverter 8 is controlled by control circuit 14, and converts the DC power supplied from converter 3 or bidirectional chopper 5 through DC lines L1 to L3 into AC power of system frequency f, and converts the DC power supplied from battery 22 through bidirectional chopper 5 into AC power in response to the occurrence of a power failure of commercial AC power supply 21. An AC output voltage of inverter 8 can be controlled to a desired value.

At this time, inverter 8 generates an AC output voltage Vo based on DC voltages Vdc1 to Vdc3 of DC lines L1 to L3. Based on AC output voltage Vo and an AC output current Io, control circuit 14 controls inverter 8 such that AC output voltage Vo becomes equal to a predetermined reference AC voltage Vor.

An output node of inverter 8 is connected to a first terminal of reactor 10, and a second terminal (node N1) of reactor 10 is connected to load 23 with electromagnetic contactor 12 being interposed. Capacitor 11 is connected between node N1 and DC line L3. A ground terminal 23a of load 23 is connected to DC line L3.

Reactor 10 and capacitor 11 constitute a low pass filter, which allows the AC power of system frequency f generated by inverter 8 to pass through load 23, and prevents a signal of a switching frequency generated in inverter 8 from passing through load 23.

Current detector 9 detects an instantaneous value of output current Io of inverter 8, and provides a signal Iof indicating the detected value to control circuit 14. An instantaneous value of AC output voltage Vo flowing through node N1 is detected by control circuit 14. Based on AC output voltage Vo and AC output current Io, control circuit 14 controls inverter 8 such that AC output voltage Vo becomes equal to predetermined reference AC voltage Vor.

Electromagnetic contactor 12 is turned on in an inverter power feeding mode in which the AC power generated by inverter 8 is supplied to load 23, and is turned off in a bypass power feeding mode in which the AC power from power system 20 is supplied to load 23.

Electromagnetic contactor 13 is connected between power system 20 and load 23. Electromagnetic contactor 13 is turned off in the inverter power feeding mode, and is turned on in the bypass power feeding mode. When inverter 8 fails in the inverter power feeding mode, electromagnetic contactor 13 is turned on and electromagnetic contactor 12 is turned off, such that the AC power from power system 20 is supplied to load 23.

Figure 3:
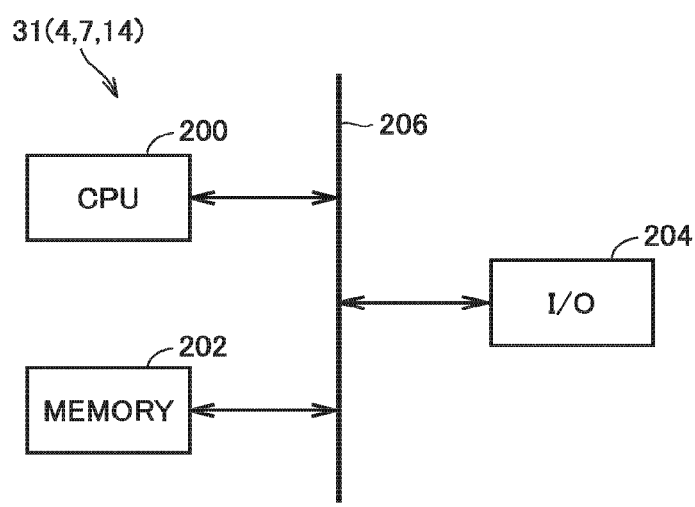
FIG. 3 is a block diagram showing a hardware configuration example of a controller.

FIG. 3 is a block diagram showing a hardware configuration example of controller 31. Typically, controller 31 can be formed by a microcomputer on which a predetermined program is prestored.

In the example of FIG. 3, controller 31 includes a central processing unit (CPU) 200, a memory 202 and an input/output (I/O) circuit 204. CPU 200, memory 202 and I/O circuit 204 can mutually receive and transmit data via a bus 206. A program is stored in a partial area of memory 202, and when CPU 200 executes the program, various functions described below can be implemented. I/O circuit 204 inputs and outputs a signal and data to and from the outside of controller 31.

Alternatively, unlike the example of FIG. 3, at least a part of controller 31 can be formed by using a circuit such as a field programmable gate array (FPGA) or an application specific integrated circuit (ASIC). At least a part of controller 31 can also be formed by an analog circuit.

Referring again to FIG. 1, in power system 20, when the generated power and the demanded power (load-consumed power) are kept in balance, system frequency f is maintained at a constant frequency (hereinafter, also referred to as "reference frequency fr"). Reference frequency fr is, for example, a set value corresponding to 50 [Hz] or 60 [Hz] that is a nominal value.

However, when an imbalance between the generated power and the demanded power occurs, system frequency f fluctuates. Specifically, when the generated power becomes larger than the demanded power (i.e., when excessive power generation occurs), system frequency f increases. When the generated power becomes smaller than the demanded power (i.e., when excessive demand occurs), system frequency f decreases. The fluctuations in system frequency f may not only affect the operation of electrical devices of consumers, but also cause a power failure of power system 20.

In addition to the electric power from commercial AC power supply 21, AC power Pd is supplied from each PCS 25 to power system 20. However, an output of each distributed power supply 26 depends largely on environmental factors. For example, when distributed power supply 26 is a photovoltaic power generation device or a wind power generation device, the output fluctuates depending on a climate condition (such as weather), a time slot, a season and the like. Therefore, as an introduction ratio of distributed power supplies 26 becomes higher, the generated power in power system 20 fluctuates more greatly.

Although a turbine generator used in a power plant has force (inertial force) so as to maintain the frequency, distributed power supply 26 does not have the inertial force. Therefore, when the introduction ratio of distributed power supplies 26 becomes high, the fluctuations in the frequency cannot be compensated by the inertial force of the turbine generator, which frequently leads to a power failure of power system 20.

Figure 4:
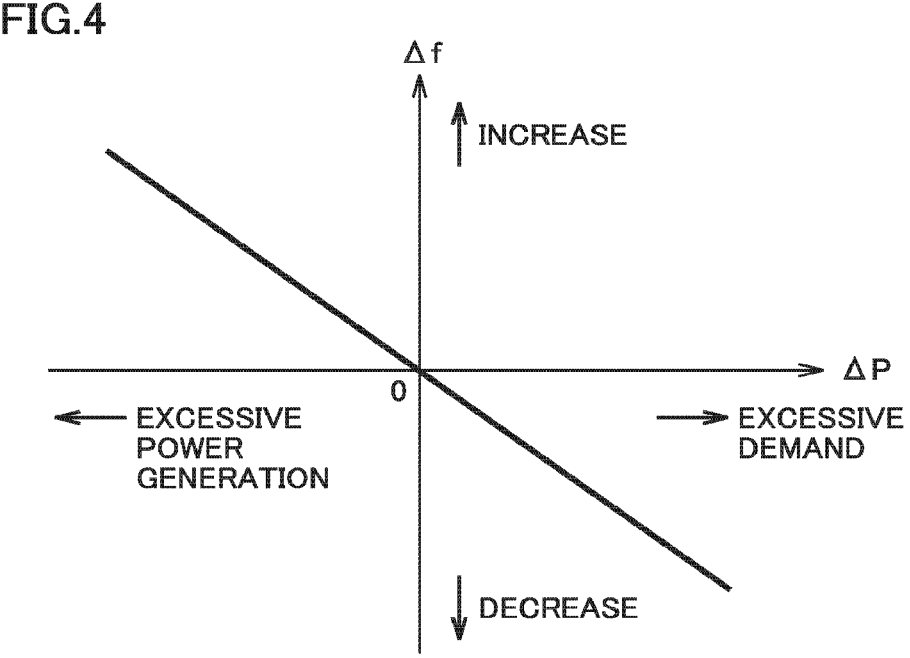
FIG. 4 is a diagram for illustrating a frequency change amount.

FIG. 4 is a diagram for illustrating a frequency change amount Δf indicating a change in system frequency f.

The vertical axis in FIG. 4 indicates frequency change amount Δf, with a frequency increase direction being a positive direction, and a frequency decrease direction being a negative direction. Frequency change amount Δf can be calculated as a difference between current system frequency f and reference frequency fr. The horizontal axis in FIG. 4 indicates differential power ΔP indicating a difference between the demanded power and the generated power, with the excessive demand in which the demanded power exceeds the generated power being a positive value, and the excessive power generation in which the generated power exceeds the demanded power being a negative value (ΔP=demanded power−generated power).

As shown in FIG. 4, when ΔP=0, i.e., when the demanded power and the generated power are kept in balance, Δf=0. In the case of the excessive demand (ΔP>0), Δf<0. In the case of the excessive power generation (ΔP<0), Δf>0.

In the example of FIG. 4, Δf and ΔP have a proportional relationship. An inclination of a straight line indicating this proportional relationship is determined by properties of power system 20. In the example of FIG. 4, the inclination of the straight line is constant. However, depending on the properties of the power system, the inclination of the straight line may vary in accordance with the magnitude of ΔP.

When power system 20 is in an excessive demand state (ΔP>0), the generated power is increased by an amount corresponding to ΔP or the demanded power is decreased by an amount corresponding to ΔP, which can result in ΔP=0, and in turn, Δf=0. In contrast, when power system 20 is in an excessive power generation state (ΔP<0), the generated power is decreased by an amount corresponding to ΔP or the demanded power is increased by an amount corresponding to ΔP, which can result in ΔP=0, and in turn, Δf=0.

In power system 20 shown in FIG. 1, when power system 20 is normal, UPS 100 generates the AC power of system frequency f using AC power Ps supplied from power system 20 and supplies the AC power to load 23, and converts a part of AC power Ps into DC power and stores the DC power in battery 22. When a power failure of power system 20 occurs, UPS 100 generates the AC power of system frequency f using the DC power stored in battery 22 and supplies the AC power to load 23.

As described above, UPS 100 is configured to use the DC power stored in battery 22 for power failure compensation in power system 20. Therefore, the DC power of battery 22 is not used when power system 20 is normal, and thus, it is hard to say that battery 22 is utilized.

Figure 5:
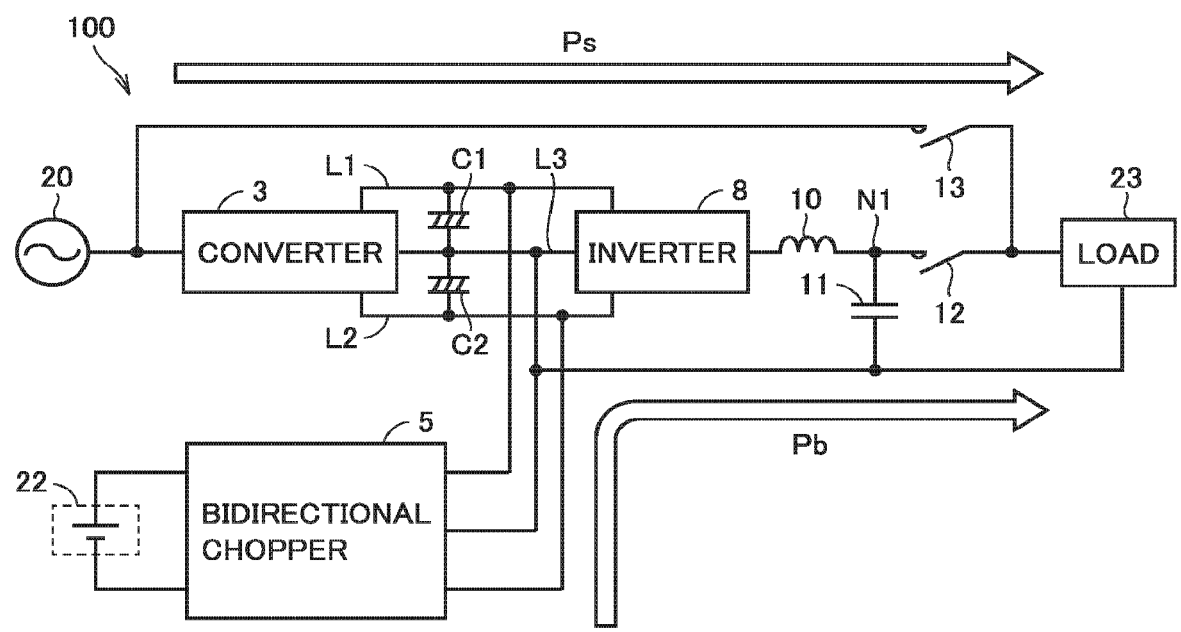
FIG. 5 conceptually shows frequency compensation by the uninterruptible power supply.
Figure 6:
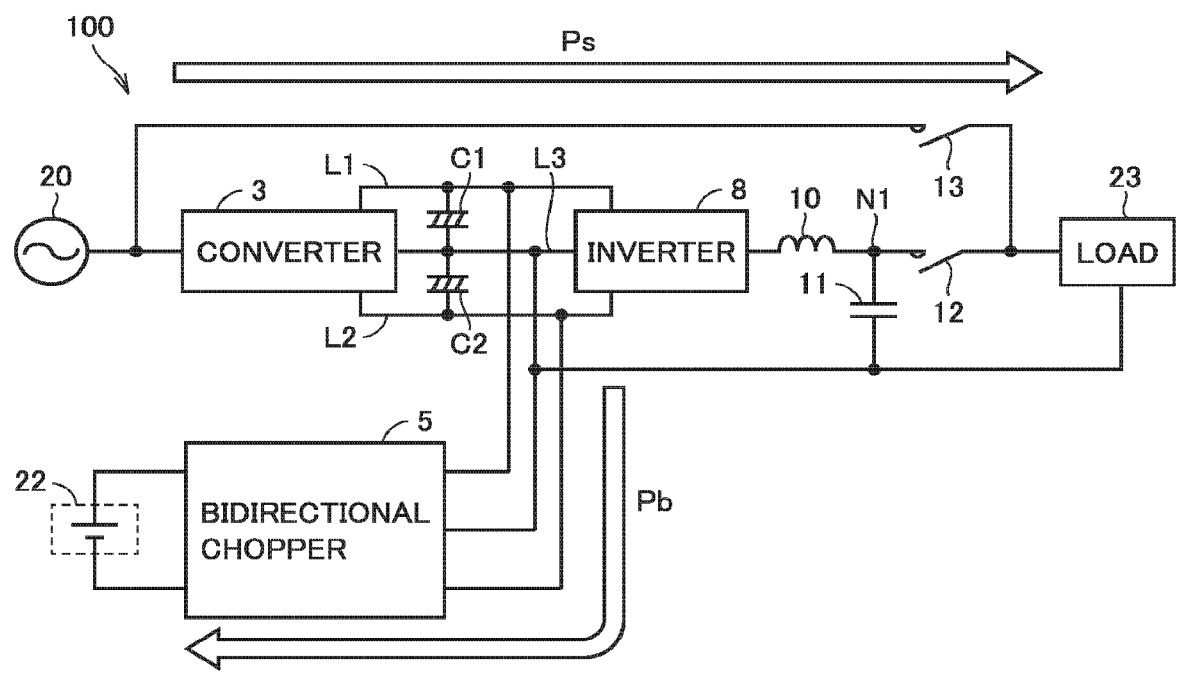
FIG. 6 conceptually shows frequency compensation by the uninterruptible power supply.

In order to deal with the above-described problem, UPS 100 according to the present embodiment is configured to compensate for fluctuations in system frequency f using battery 22, when power system 20 is normal. Specifically, UPS 100 compensates for fluctuations in system frequency f by adjusting the demanded power to attain ΔP=0 in accordance with fluctuations in the generated power in power system 20. FIGS. 5 and 6 conceptually show frequency compensation by UPS 100.

FIG. 5 shows frequency compensation when power system 20 is in the excessive demand state (ΔP>0). Arrows in FIG. 5 indicate electric power Ps supplied from power system 20 to UPS 100 and electric power Pb supplied from battery 22 to UPS 100. Namely, UPS 100 supplies, to load 23, electric power obtained by adding electric power Ps and electric power Pb.

In the following description, a direction in which DC current Ib flows from the positive electrode of battery 22 to low-voltage-side node 5d of bidirectional chopper 5 is a positive direction, and electric power (discharging power) Pb when the DC power of battery 22 is discharged is a positive value. In contrast, a direction in which DC current Ib flows from low-voltage-side node 5d of bidirectional chopper 5 to the positive electrode of battery 22 is a negative direction, and electric power (charging power) Pb when the DC power is charged into battery 22 is a negative value.

As shown in FIG. 4, when power system 20 is in the excessive demand state (ΔP>0), system frequency f decreases, which results in frequency change amount Δf<0. In this case, if the demanded power can be decreased by an amount of differential power ΔP corresponding to frequency change amount Δf, the excessive demand can be eliminated and the decrease in system frequency f can be compensated.

Thus, UPS 100 operates bidirectional chopper 5 to discharge electric power Pb corresponding to differential power ΔP from battery 22. By making discharging power Pb of battery 22 equal to differential power ΔP, electric power Ps supplied from power system 20 to UPS 100 can be decreased by the amount corresponding to differential power ΔP. As a result, the demanded power in power system 20 decreases by the amount corresponding to differential power ΔP and balances with the generated power, and thus, the decrease in system frequency f is compensated.

FIG. 6 shows frequency compensation when power system 20 is in the excessive power generation state (ΔP<0). Arrows in FIG. 6 indicate electric power Ps supplied from power system 20 to UPS 100 and electric power (charging power) Pb supplied from UPS 100 to battery 22. Namely, electric power obtained by subtracting electric power Pb from electric power Ps is supplied to load 23.

As shown in FIG. 4, when power system 20 is in the excessive power generation state (ΔP<0), system frequency f increases, which results in frequency change amount Δf>0. In this case, if the demanded power can be increased by an amount corresponding to differential power ΔP, the excessive power generation can be eliminated and the increase in system frequency f can be compensated.

Thus, UPS 100 operates bidirectional chopper 5 to charge electric power Pb corresponding to differential power ΔP into battery 22. By making charging power Pb of battery 22 equal to differential power ΔP, electric power Ps supplied from power system 20 to UPS 100 can be increased by the amount corresponding to differential power ΔP. As a result, the demanded power in power system 20 increases by the amount corresponding to differential power ΔP and balances with the generated power, and thus, the increase in system frequency f is compensated.

As described above, UPS 100 according to the present embodiment is configured to adjust electric power Ps supplied from power system 20 to UPS 100 by charging the DC power into battery 22 or discharging the DC power from battery 22, and thereby adjust the demanded power in power system 20, when power system 20 is normal. Therefore, UPS 100 adjusts the demanded power in power system 20 by charging or discharging battery 22 in accordance with differential power ΔP calculated from frequency change amount Δf, and thus, the demanded power and the generated power can be balanced with each other and fluctuations in system frequency f can be compensated.

The frequency compensation by UPS 100 according to the present embodiment will be described in detail below. The frequency compensation is mainly implemented by bidirectional chopper 5 and control circuit 7.

Figure 7:
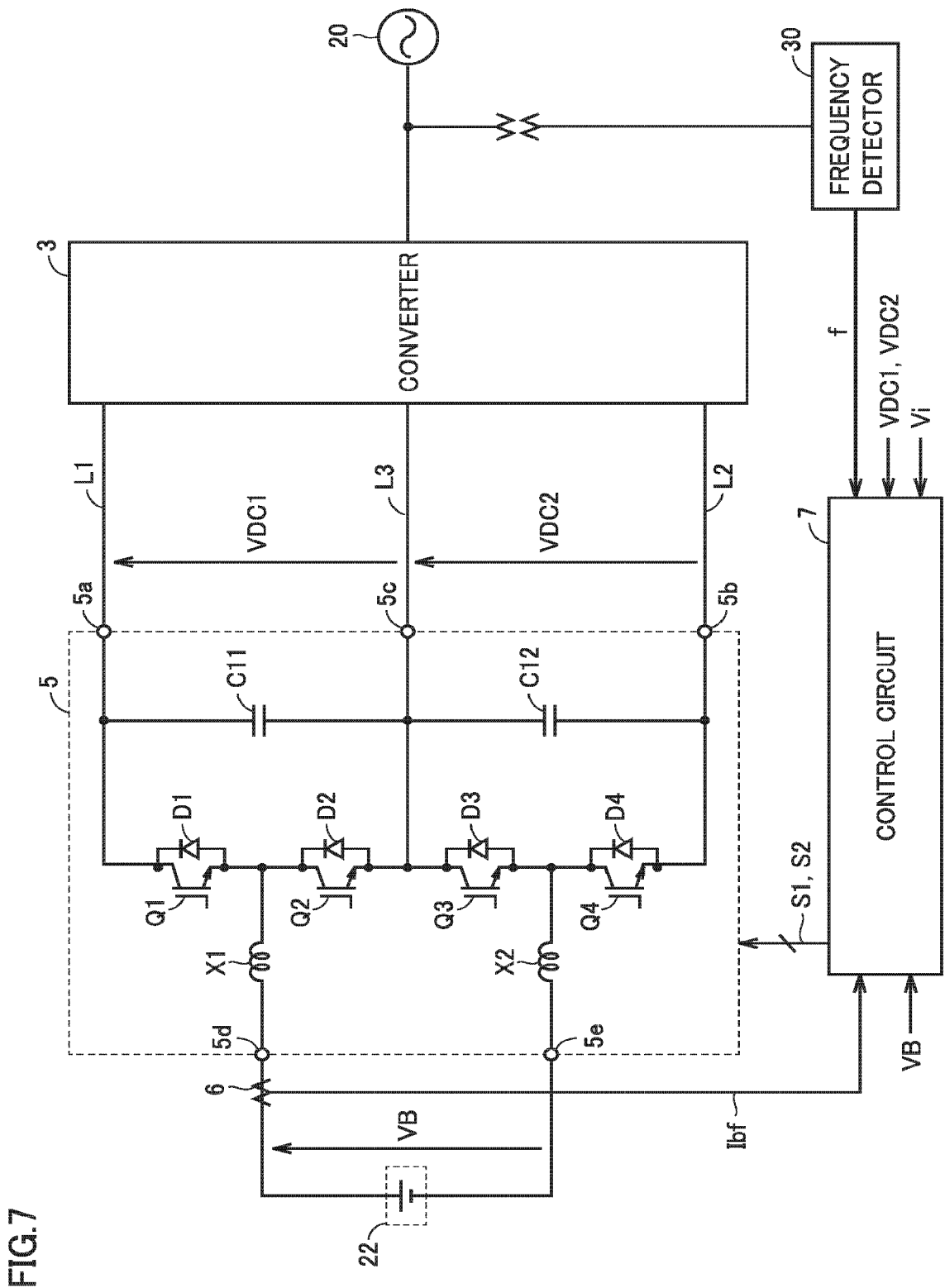
FIG. 7 is a circuit diagram showing a configuration of a bidirectional chopper.

FIG. 7 is a circuit diagram showing a configuration of bidirectional chopper 5.

As shown in FIG. 7, bidirectional chopper 5 includes insulated gate bipolar transistors (IGBTs) Q1 to Q4, diodes D1 to D4, reactors X1 and X2, and capacitors C11 and C12.

A collector of IGBT Q1 is connected to high-voltage-side node 5a, and an emitter thereof is connected to low-voltage-side node 5d with reactor X1 being interposed, and is connected to a collector of IGBT Q2. An emitter of IGBT Q2 is connected to high-voltage-side node 5c and is connected to a collector of IGBT Q3. An emitter of IGBT Q3 is connected to low-voltage-side node 5e with reactor X2 being interposed, and is connected to a collector of IGBT Q4. An emitter of IGBT Q4 is connected to high-voltage-side node 5b.

Diodes D1 to D4 are connected in antiparallel to IGBTs Q1 to Q4, respectively. Capacitor C11 is connected between high-voltage-side nodes 5a and 5c, to stabilize DC voltage VDC1 between high-voltage-side nodes 5a and 5c. Capacitor C12 is connected between high-voltage-side nodes 5c and 5b, to stabilize DC voltage VDC2 between high-voltage-side nodes 5c and 5b.

In response to power system 20 entering the excessive power generation state (ΔP<0) when power system 20 is normal, IGBT Q1 and IGBT Q4 are turned on and off at a predetermined frequency, to store the DC power generated by converter 3 in battery 22. When power system 20 is in the excessive power generation state, IGBTs Q2 and Q3 are fixed in the off state.

IGBTs Q1 and Q4 are controlled by a gate signal S1 from control circuit 7. Gate signal S1 is alternately set to an H (logic high) level and an L (logic low) level at a predetermined frequency. When gate signal S1 is set to the H level, IGBTs Q1 and Q4 are turned on. When gate signal S1 is set to the L level, IGBTs Q1 and Q4 are turned off.

When IGBTs Q1 and Q4 are turned on, current Ib flows along a route from DC line L1 through IGBT Q1, reactor X1, battery 22, reactor X2, and IGBT Q4 to DC line L2, such that battery 22 is charged and electromagnetic energy is stored in reactors X1 and X2.

When IGBTs Q1 and Q4 are turned off, a current flows along a route from a first terminal (terminal on the battery 22 side) of reactor X1 through battery 22, reactor X2, and diodes D3 and D2 to a second terminal of reactor X1, such that battery 22 is charged and the electromagnetic energy of reactors X1 and X2 is released.

A ratio between a time period during which gate signal S1 is in the H level (pulse width) and one period is called "duty ratio". By adjusting the duty ratio of gate signal S1, battery voltage VB can be adjusted to predetermined reference DC voltage VBr. Alternatively, by adjusting the duty ratio of gate signal S1, DC power (charging power) Pb charged into battery 22 can be adjusted to predetermined reference DC power Pbr. DC voltage VDC=VDC1+VDC2 between DC lines L1 and L2 is stepped down and provided to battery 22, and VB<VDC is attained.

In response to power system 20 entering the excessive demand state ($\Delta P>0$) when power system 20 is normal, or in response to the occurrence of a power failure of power system 20, IGBT Q2 and IGBT Q3 are turned on and off at a predetermined frequency, to supply the DC power of battery 22 to inverter 8. When power system 20 is in the excessive demand state or when there is a power failure of power system 20, IGBTs Q1 and Q4 are fixed in the off state.

IGBTs Q2 and Q3 are controlled by a gate signal S2 from control circuit 7. Gate signal S2 is alternately set to an H level and an L level at a predetermined frequency. When gate signal S2 is set to the H level, IGBTs Q2 and Q3 are turned on. When gate signal S2 is set to the L level, IGBTs Q2 and Q3 are turned off.

When IGBTs Q2 and Q3 are turned on, a current flows from the positive electrode of battery 22 through reactor X1, IGBTs Q2 and Q3, and reactor X2 to the negative electrode of battery 22, such that electromagnetic energy is stored in reactors X1 and X2. When IGBTs Q2 and Q3 are turned off, the current flowing from reactor X1 to IGBT Q2 is commutated from reactor X1 to diode D1 and flows to the negative electrode of battery 22 through capacitors C11 and C12, diode D4, and reactor X2, such that capacitors C11 and C12 are charged and the electromagnetic energy of reactors X1 and X2 is released.

A ratio between a time period during which gate signal S2 is in the H level (pulse width) and one period is called "duty ratio". By adjusting the duty ratio of gate signal S2, DC voltage VDC=VDC1+VDC2 between DC lines L1 and L2 can be adjusted to predetermined reference DC voltage VDCr. Alternatively, by adjusting the duty ratio of gate signal S2, DC power (discharging power) Pb discharged from battery 22 can be adjusted to predetermined reference DC power Pbr. Battery voltage VB is boosted and provided between DC lines L1 and L2, and VB<VDC is attained.

Figure 8:
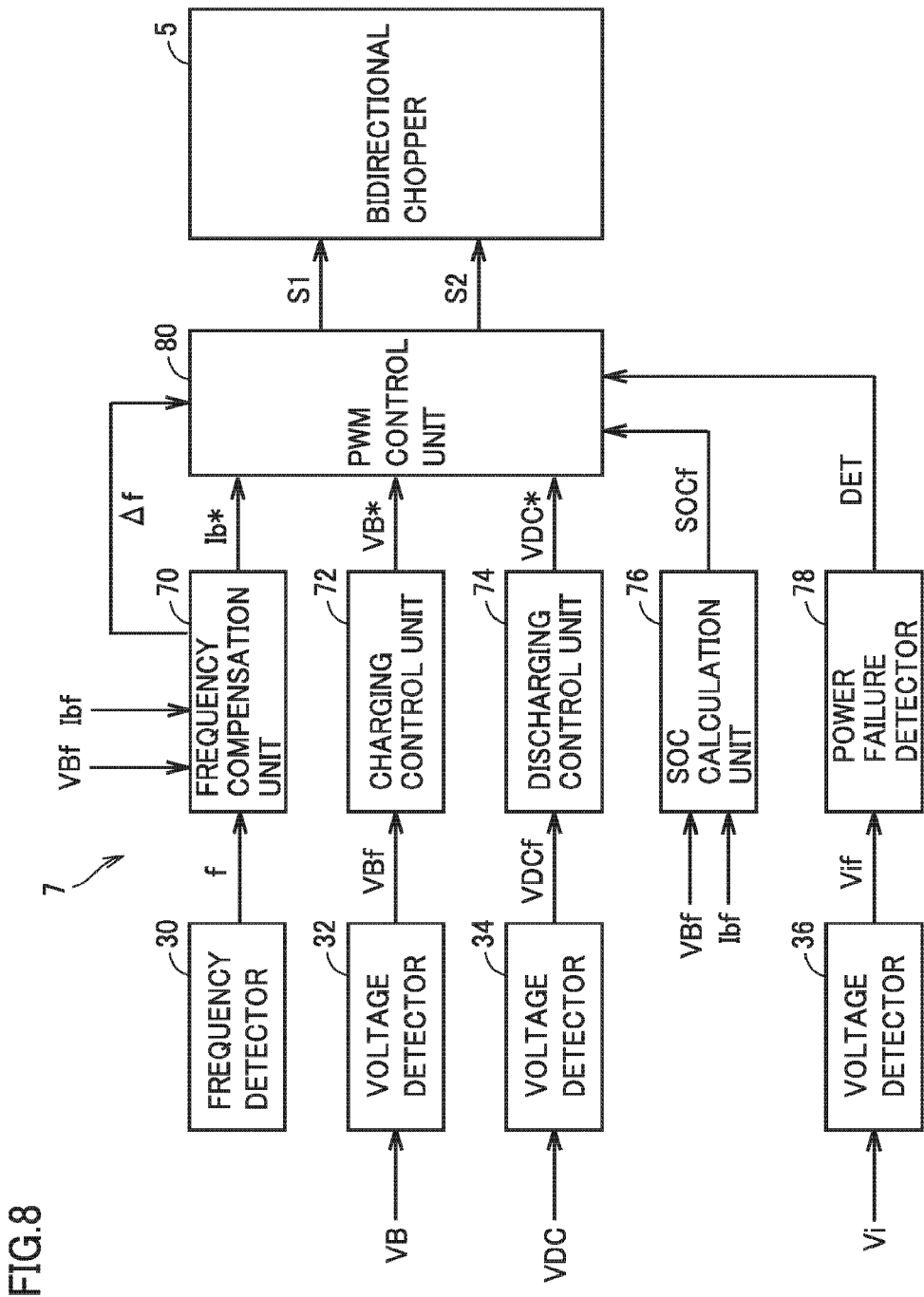
FIG. 8 is a block diagram showing a configuration of a control circuit.

FIG. 8 is a block diagram showing a configuration of control circuit 7.

As shown in FIG. 8, control circuit 7 includes voltage detectors 32, 34 and 36, a frequency compensation unit 70, a charging control unit 72, a discharging control unit 74, a state of charge (SOC) calculation unit 76, a power failure detector 78, and a pulse width modulation (PWM) control unit 80.

Frequency compensation unit 70 calculates frequency change amount $\Delta f$ indicating a change (increase or decrease) in system frequency f, using system frequency f detected by frequency detector 30. By referring to the preliminarily obtained properties of power system 20 (see FIG. 4), frequency compensation unit 70 calculates differential power $\Delta P$ indicating a difference between the demanded power and the generated power in power system 20, based on frequency change amount $\Delta f$. Frequency compensation unit 70 generates a current command value Ib* for controlling DC current Ib such that DC power Pb corresponding to calculated differential power $\Delta P$ is charged into or discharged from battery 22. Current command value Ib* is input to PWM control unit 80.

Voltage detector 32 detects inter-terminal voltage (battery voltage) VB of battery 22, and outputs a signal VBf indicating the detected value. Voltage detector 34 detects DC voltage VDC between DC lines L1 and L2, and outputs a signal VDCf indicating the detected value. Voltage detector 36 detects AC input voltage Vi, and outputs a signal Vif indicating the detected value.

Charging control unit 72 generates reference DC voltage VBr that is a target voltage of battery voltage VB. Based on battery voltage VB indicated by output signal VBf of voltage detector 32, charging control unit 72 generates a voltage command value VB* such that battery voltage VB becomes equal to reference DC voltage VBr. Voltage command value VB* is input to PWM control unit 80.

Discharging control unit 74 generates reference DC voltage VDCr that is a target voltage of DC voltage VDC between DC lines L1 and L2. Based on DC voltage VDC indicated by output signal VDCf of voltage detector 34, discharging control unit 74 generates a voltage command value VDC* such that DC voltage VDC becomes equal to reference DC voltage VDCr. Voltage command value VDC* is input to PWM control unit 80.

SOC calculation unit 76 calculates an SOC of battery 22 using the detected value of battery voltage VB and/or the detected value of DC current Ib. The SOC of battery 22 is a value indicating an amount of power storage in battery 22, and indicates a current amount of power storage with respect to a full-charge capacity of battery 22 in percentage, for example. A known method such as a method using an integrated value of DC current Ib or a method using an OCV-SOC curve that indicates a relationship between an open circuit voltage (OCV) and the SOC of battery 22 can be used as a method for calculating the SOC. A signal SOCf indicating the calculated value of the SOC is input to PWM control unit 80.

Power failure detector 78 detects whether or not a power failure of power system 20 has occurred, based on the detected value of AC input voltage Vi by voltage detector 36, and outputs a signal DET indicating the detection result. When AC input voltage Vi is within a preset normal range, power failure detector 78 determines that power system 20 is normal, and outputs signal DET of the L level. When AC input voltage Vi is lower than the normal range, power failure detector 78 determines that there is a power failure of power system 20, and outputs signal DET of the H level. Output signal DET of power failure detector 78 is provided to PWM control unit 80.

Figure 9:
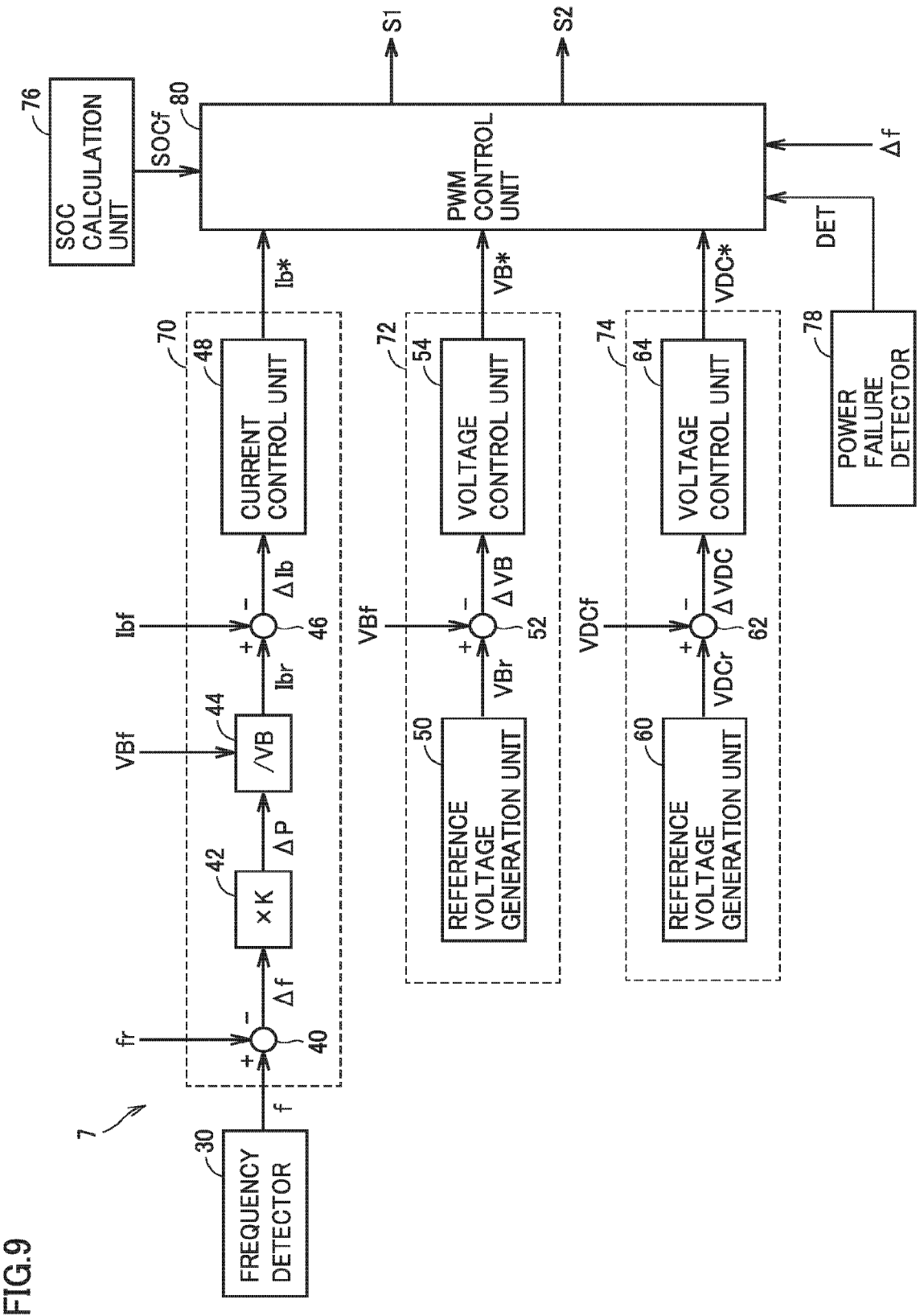
FIG. 9 is a block diagram showing a configuration example of a frequency compensation unit, a charging control unit and a discharging control unit shown in FIG. 8.

FIG. 9 is a block diagram showing a configuration example of frequency compensation unit 70, charging control unit 72 and discharging control unit 74 shown in FIG. 8.

As shown in FIG. 9, frequency compensation unit 70 includes subtractors 40 and 46, a multiplier 42, a divider 44, and a current control unit 48. Subtractor 40 subtracts reference value (reference frequency) fr of the system frequency from the detected value of system frequency f by frequency detector 30, to thereby calculate frequency change amount Δf. Subtractor 40 corresponds to an example of "frequency change calculation unit".

Reference frequency fr is, for example, a set value corresponding to 50 [Hz] or 60 [Hz] that is a nominal value. When system frequency f increases, frequency change amount Δf has a positive polarity (Δf>0). When system frequency f decreases, frequency change amount Δf has a negative polarity (Δf<0). A method for calculating frequency change amount Δf is not limited to the above-described example. Frequency change amount Δf can be calculated using an arbitrary method including a change of the definition of polarity (positive/negative), as long as it can express the increase and decrease in system frequency.

Multiplier 42 multiplies frequency change amount Δf by a compensation gain K, to thereby calculate differential power ΔP. Compensation gain K can be determined based on the preliminarily obtained properties of power system 20 (see FIG. 4). In the example of FIG. 4, Δf and ΔP have the proportional relationship, and thus, compensation gain K can be determined based on the inclination of the straight line indicating the proportional relationship. Multiplier 42 corresponds to an example of "computation unit".

The relationship between Δf and ΔP varies depending on a power system and is not limited to the proportional relationship shown in FIG. 4. For example, the relationship between Δf and ΔP may be a nonlinear relationship having such a tendency that a rate of change in Δf becomes higher as the magnitude of ΔP becomes greater. In such a case, by referring to the nonlinear relationship, differential power ΔP can be calculated based on frequency change amount Δf.

Divider 44 divides differential power ΔP by battery voltage VB indicated by output signal VBf of voltage detector 32, to thereby calculate reference DC current Ibr that is a target current of DC current Ib.

Subtractor 46 obtains a difference ΔIb=Ibr−Ib between reference DC current Ibr and DC current Ib indicated by output signal Ibf of current detector 6. Current control unit 48 adds a value proportional to difference ΔIb and an integral value of difference ΔIb, to thereby generate current command value Ib*.

Charging control unit 72 includes a reference voltage generation unit 50, a subtractor 52 and a voltage control unit 54. Reference voltage generation unit 50 generates reference DC voltage VBr that is a target voltage of battery voltage VB. For example, reference voltage generation unit 50 sets reference DC voltage VBr to correspond to the OCV when the SOC has a predetermined threshold value Sth in the OCV-SOC curve of battery 22.

Subtractor 52 obtains a difference ΔVB=VBr−VB between reference DC voltage VBr and battery voltage VB indicated by output signal VBf of voltage detector 32. Voltage control unit 54 adds a value proportional to difference ΔVB and an integral value of difference ΔVB, to thereby generate voltage command value VB*.

Charging control unit 72 includes a reference voltage generation unit 60, a subtractor 62 and a voltage control unit 64. Reference voltage generation unit 60 generates reference DC voltage VDCr that is a target voltage of DC voltage VDC between DC lines L1 and L2. Subtractor 62 obtains a difference ΔVDC=VDCr−VDC between reference DC voltage VDCr and DC voltage VDC indicated by output signal VDCf of voltage detector 34. Voltage control unit 64 adds a value proportional to difference ΔVDC and an integral value of difference ΔVDC, to thereby generate voltage command value VDC*.

PWM control unit 80 selects any one of current command value Ib* from frequency compensation unit 70, voltage command value VB* from charging control unit 72, and voltage command value VDC* from discharging control unit 74, based on output signal DET of power failure detector 78, output signal SOCf of SOC calculation unit 76, and frequency change amount Δf. PWM control unit 80 generates gate signals S1 and S2 based on a result of comparison between the selected command value and a carrier wave signal CW of a predetermined frequency.

Specifically, when output signal DET of power failure detector 78 is in the H level (when a power failure of power system 20 occurs), PWM control unit 80 selects voltage command value VDC* from discharging control unit 74. PWM control unit 80 generates gate signal S2 based on a result of comparison between voltage command value VDC* and carrier wave signal CW, and fixes gate signal S1 in the L level.

In contrast, when output signal DET of power failure detector 78 is in the L level (when power system 20 is normal), PWM control unit 80 selects any one of current command value Ib*, voltage command value VB* and voltage command value VDC*, in accordance with frequency change amount Δf and the SOC of battery 22 indicated by output signal SOCf of SOC calculation unit 76.

Figure 10:
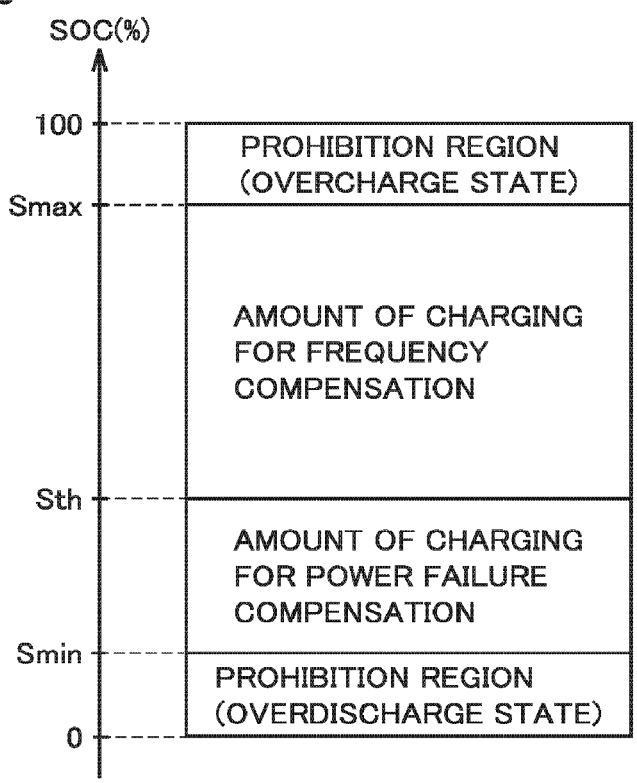
FIG. 10 is a diagram for illustrating determination values set in an SOC of a battery.

In UPS 100, in order to achieve both the original function (power failure compensation function) as a backup power supply when a power failure of power system 20 occurs and the above-described frequency compensation function, determination values Smin, Smax and Sth serving as indexes for performing charging and discharging of battery 22 and frequency compensation are set in the SOC of battery 22. FIG. 10 is a diagram for illustrating the determination values set in the SOC of battery 22. SOC=0% corresponds to an empty state of battery 22, and SOC=100% corresponds to a fully-charged state of battery 22.

As shown in FIG. 10, a prohibition region where charging of battery 22 is prohibited in order to prevent overcharge, and a prohibition region where discharging of battery 22 is prohibited in order to prevent overdischarge are set in the SOC. A control range of the SOC has an upper limit value Smax and a lower limit value Smin that are set based on these prohibition regions. When the SOC exceeds Smax (SOC>Smax), charging of battery 22 is prohibited. When the SOC falls below Smin (SOC<Smin), discharging of battery 22 is prohibited.

In this control range of the SOC, an amount of charging in battery 22 is divided into an amount of charging for backup and an amount of charging for frequency compensation by threshold value Sth. The amount of charging for power failure compensation refers to an amount of charging required to continue to supply the electric power from battery 22 to load 23 for a predetermined time period or longer when a power failure of power system 20 occurs. In order to achieve power failure compensation for load 23, it is necessary to maintain SOC≥Sth when power system 20 is normal.

The amount of charging for frequency compensation refers to an amount of charging used to discharge the DC power from battery 22 in order to compensate for the decrease in system frequency f, or used to charge the DC power into battery 22 in order to compensate for the increase in system frequency f. The frequency compensation function is performed in the range of Sth≤SOC≤Smax. When the SOC falls below Sth (SOC<Sth), discharging of battery 22 for frequency compensation is prohibited. As a result, power failure compensation for load 23 is protected. When the SOC exceeds Smax (SOC>Smax), charging of battery 22 for frequency compensation is prohibited.

PWM control unit 80 compares the SOC of battery 22 indicated by output signal SOCf of SOC calculation unit 76 with determination values Smin, Smax and Smin, and selects any one of current command value Ib*, voltage command value VB* and voltage command value VDC* based on the comparison result and frequency change amount Δf.

Figure 11:
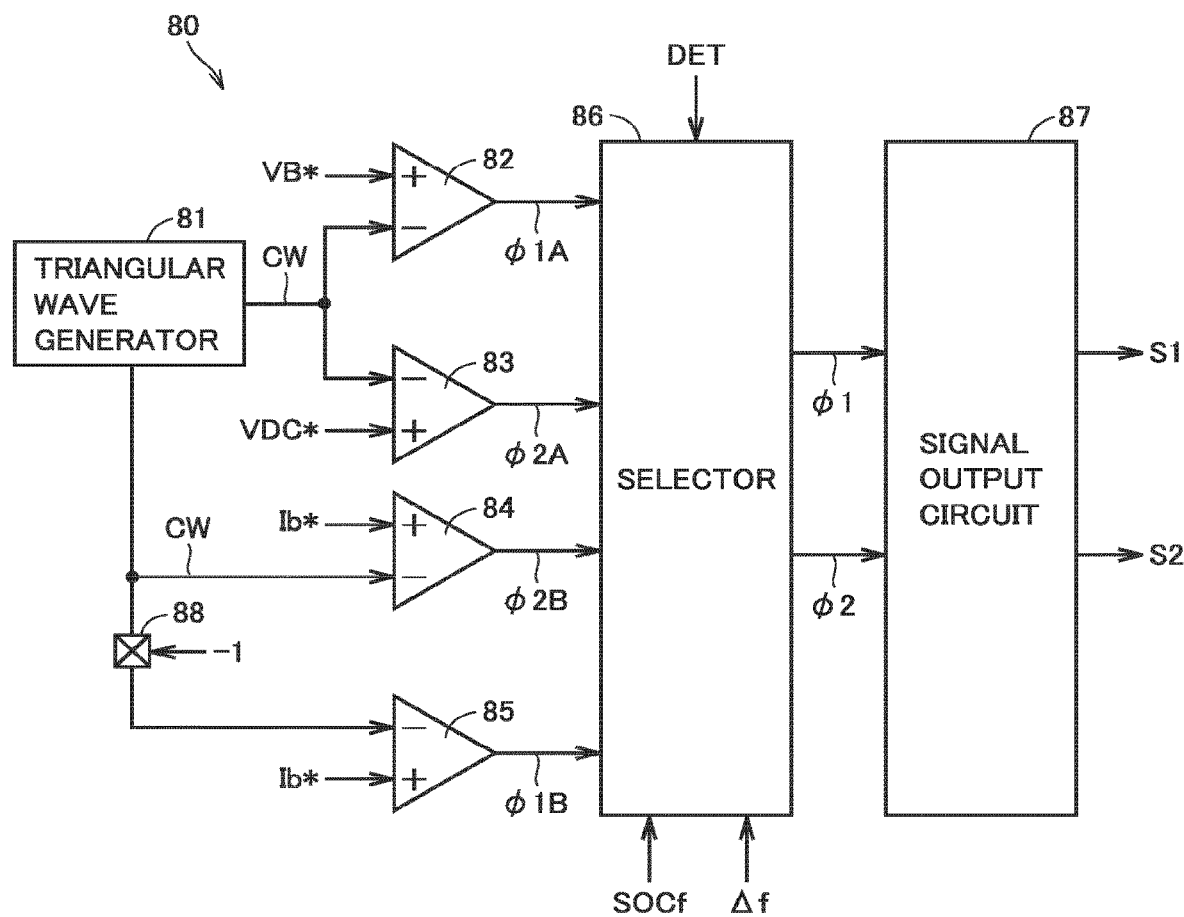
FIG. 11 is a block diagram showing a configuration example of a PWM control unit shown in FIG. 8.

FIG. 11 is a block diagram showing a configuration example of PWM control unit 80 shown in FIG. 8.

As shown in FIG. 11, PWM control unit 80 includes a triangular wave generator 81, comparators 82 to 85, a selector 86, a signal output circuit 87, and a multiplier 88.

Triangular wave generator 81 generates carrier wave signal CW of a predetermined frequency. Carrier wave signal CW is, for example, a triangular wave signal. Multiplier 88 inverts the polarity of carrier wave signal CW.

Comparator 82 compares whether voltage command value VB* from charging control unit 72 (FIG. 8) is higher or lower than carrier wave signal CW, and outputs a PWM signal φ1A indicating the comparison result. When VB*>CW, PWM signal φ1A is set in the H level. When VB*<CW, PWM signal φ1A is set in the L level.

Comparator 83 compares whether voltage command value VDC* from discharging control unit 74 (FIG. 8) is higher or lower than carrier wave signal CW, and outputs a PWM signal φ2A indicating the comparison result. When VDC*>CW, PWM signal φ2A is set in the H level. When VDC*<CW, PWM signal φ2A is set in the L level.

Comparator 84 compares whether current command value Ib* from frequency compensation unit 70 (FIG. 8) is higher or lower than carrier wave signal CW, and outputs a PWM signal φ2B indicating the comparison result. When Ib*>CW, PWM signal φ2B is set in the H level. When Ib*<CW, PWM signal φ2B is set in the L level. When current command value Ib* is a positive value (when battery 22 is discharged), comparator 84 generates PWM signal φ2B.

Comparator 85 compares whether current command value Ib* from frequency compensation unit 70 (FIG. 8) is higher or lower than carrier wave signal CW having the inverted polarity, and outputs a PWM signal φ1B indicating the comparison result. When Ib*>CW, PWM signal φ1B is set in the H level. When Ib*<CW, PWM signal φ1B is set in the L level. When current command value Ib* is a negative value (when battery 22 is charged), comparator 85 generates PWM signal φ1B.

Selector 86 selects any one of PWM signals φ1A, φ2A, φ1B, and φ2B based on output signal DET of power failure detector 78 (FIG. 8), output signal SOCf of SOC calculation unit 76 (FIG. 8), and frequency change amount Δf.

Specifically, when output signal DET of power failure detector 78 is in the H level (when a power failure of power system 20 occurs), selector 86 selects PWM signal φ2A and provides selected PWM signal φ2A to signal output circuit 87 as a PWM signal φ2.

When output signal DET of power failure detector 78 is in the L level (when power system 20 is normal) and when the SOC of battery 22 is less than threshold value Sth, selector 86 selects PWM signal φ1A and provides selected PWM signal φ1A to signal output circuit 87 as a PWM signal φ1.

When output signal DET of power failure detector 78 is in the L level (when power system 20 is normal) and when the SOC of battery 22 is equal to or more than threshold value Sth, selector 86 selects one of PWM signals φ1B and φ2B in accordance with frequency change amount Δf. Specifically, when Δf>0, selector 86 selects PWM signal φ1B and provides selected PWM signal φ1B to signal output circuit 87 as PWM signal φ1. When Δf<0, selector 86 selects PWM signal φ2B and provides selected PWM signal φ2B to signal output circuit 87 as PWM signal φ2.

Signal output circuit 87 generates gate signals S1 and S2 based on PWM signals φ1 and φ2 provided from selector 86. Specifically, when PWM signal φ1 is provided from selector 86, signal output circuit 87 performs an amplification and level conversion process on PWM signal φ1, generates gate signal S1 having the same waveform as that of PWM signal φ1, and provides gate signal S1 to gates of IGBTs Q1 and Q4 of bidirectional chopper 5. In this case, signal output circuit 87 fixes gate signal S2 in the L level.

According to the foregoing, (1) when power system 20 is normal and when SOC<Sth, or (2) when power system 20 is normal and when SOC≥Sth and Δf>0 (excessive power generation), IGBTs Q1 and Q4 of bidirectional chopper 5 are turned on and off in accordance with gate signal S1, and DC voltage VDC between DC lines L1 and L2 is stepped down and supplied to battery 22.

When PWM signal φ2 is provided from selector 86, signal output circuit 87 performs an amplification and level conversion process on PWM signal φ2, generates gate signal S2 having the same waveform as that of PWM signal φ2, and provides gate signal S2 to gates of IGBTs Q2 and Q3 of bidirectional chopper 5. In this case, signal output circuit 87 fixes gate signal S1 in the L level.

According to the foregoing, (3) when a power failure of power system 20 occurs, or (4) when power system 20 is normal and when SOC≥Sth and Δf<0 (excessive demand), IGBTs Q2 and Q3 of bidirectional chopper 5 are turned on and off in accordance with gate signal S2, and battery voltage VB is boosted and supplied to inverter 8 through DC lines L1 and L2.

Figure 12:
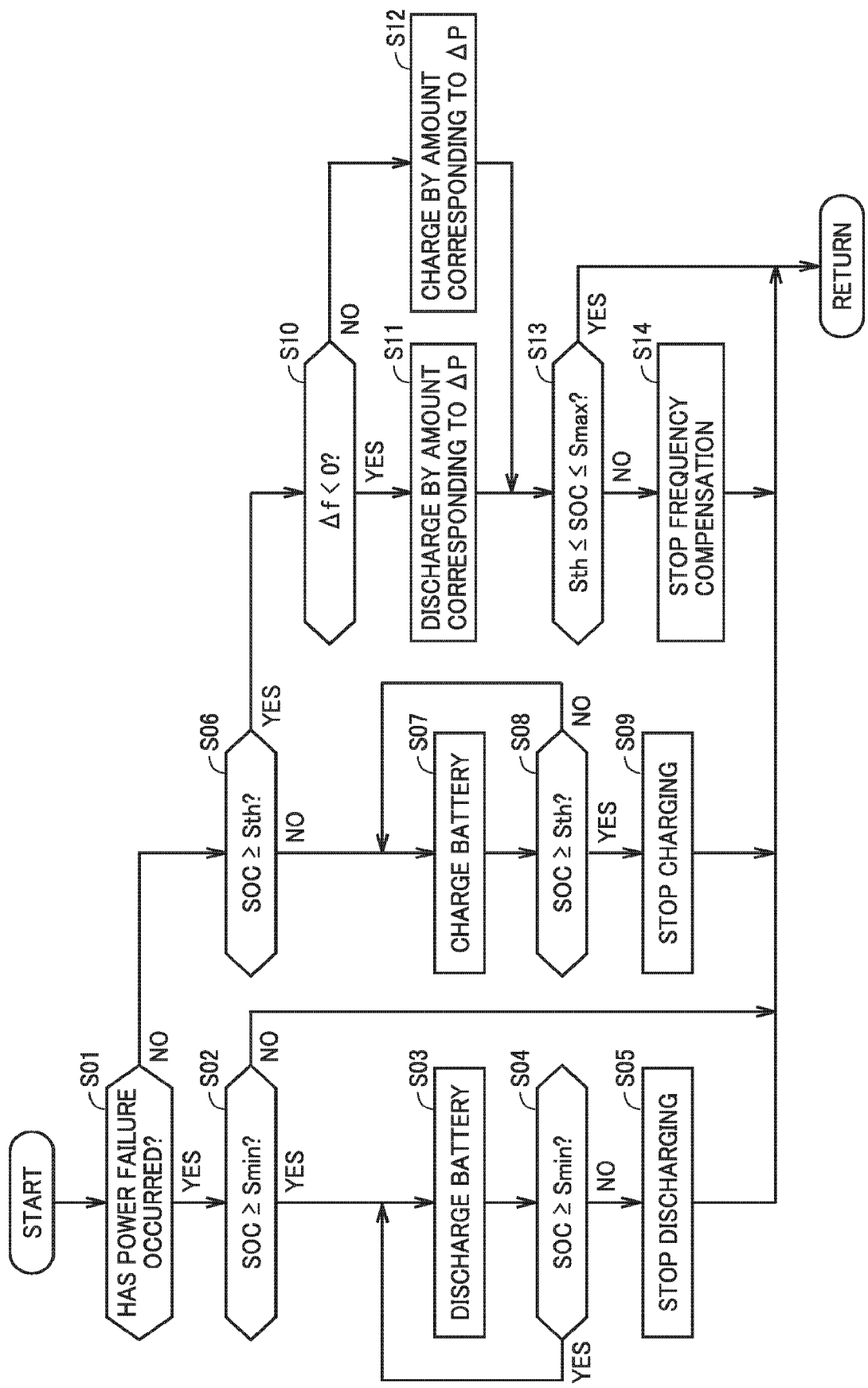
FIG. 12 is a flowchart for illustrating an operation of the bidirectional chopper.

FIG. 12 is a flowchart for illustrating an operation of bidirectional chopper 5 by control circuit 7. The flowchart in FIG. 12 is repeatedly performed by control circuit 7 during operation of UPS 100.

As shown in FIG. 12, in step (hereinafter, simply denoted as "S") 01, control circuit 7 determines whether or not a power failure of power system 20 has occurred, based on the detected value of AC input voltage Vi by voltage detector 36. When AC input voltage Vi is in the normal range, determination of NO is made in S01. When AC input voltage Vi is lower than the normal range, determination of YES is made in S01.

When a power failure of power system 20 has occurred (determination of YES is made in S01), control circuit 7 compares the SOC of battery 22 with lower limit value Smin of the control range in S02.

When SOC≥Smin (determination of YES is made in S02), the process proceeds to S03, where control circuit 7 controls bidirectional chopper 5 to discharge the DC power from battery 22. In S03, control circuit 7 generates voltage command value VDC* such that DC voltage VDC between DC lines L1 and L2 becomes equal to reference DC voltage VDCr. Then, control circuit 7 turns on and off IGBTs Q2 and Q3 of bidirectional chopper 5 in accordance with gate signal S2 having the same waveform as that of PWM signal φ2A generated based on voltage command value VDC*. As a result, DC power Pb of battery 22 is supplied to inverter 8 by bidirectional chopper 5, and is converted into AC power, which is supplied to load 23.

During discharging of battery 22, control circuit 7 compares the SOC of battery 22 with lower limit value Smin in S04. When SOC≥Smin (determination of YES is made in S04), control circuit 7 continues discharging of battery 22 in S03. When SOC<Smin (determination of NO is made in S04), control circuit 7 stops the operation of bidirectional chopper 5 and stops discharging of battery 22 in S05.

Referring again to S01, when power system 20 is normal (determination of NO is made in S01), the process proceeds to S06, where control circuit 7 compares the SOC of battery 22 with threshold value Sth.

When SOC<Sth (determination of NO is made in S06), the process proceeds to S07, where control circuit 7 controls bidirectional chopper 5 to charge the DC power into battery 22. In S07, control circuit 7 generates voltage command value VB* such that battery voltage VB becomes equal to reference DC voltage VBr. Then, control circuit 7 turns on and off IGBTs Q1 and Q4 of bidirectional chopper 5 in accordance with gate signal S1 having the same waveform as that of PWM signal ϕ1A generated based on voltage command value VB*. As a result, a part of the DC power generated by converter 3 is stored in battery 22 by bidirectional chopper 5.

During charging of battery 22, control circuit 7 compares the SOC of battery 22 with threshold value Sth in S08. When SOC<Sth (determination of NO is made in S08), control circuit 7 continues charging of battery 22 in S07. When SOC≥Sth (determination of YES is made in S08), control circuit 7 stops the operation of bidirectional chopper 5 and stops charging of battery 22 in S09.

Referring again to S06, when SOC≥Sth (determination of YES is made in S06), control circuit 7 determines the polarity of frequency change amount Δf in S10.

When Δf<0 (determination of YES is made in S10), control circuit 7 determines that power system 20 is in the excessive demand state. In this case, in S11, control circuit 7 calculates differential power ΔP based on frequency change amount Δf, and controls bidirectional chopper 5 such that DC power Pb corresponding to calculated differential power ΔP is discharged from battery 22 (see FIG. 5).

In S11, control circuit 7 generates current command value Ib* such that DC current Ib becomes equal to reference DC current Ibr calculated from differential power ΔP. Then, control circuit 7 turns on and off IGBTs Q2 and Q3 of bidirectional chopper 5 in accordance with gate signal S2 having the same waveform as that of PWM signal ϕ2B generated based on current command value Ib*. As a result, DC power Pb corresponding to differential power ΔP is discharged from battery 22 and supplied to inverter 8, and is converted into AC power, which is supplied to load 23. Since DC power Pb corresponding to differential power ΔP is discharged from battery 22, AC power Ps supplied from power system 20 to UPS 100 decreases by the amount corresponding to differential power ΔP. As a result, the excessive demand in power system 20 is eliminated and the decrease in system frequency f is compensated.

Referring again to S10, when Δf>0 (determination of NO is made in S10), control circuit 7 determines that power system 20 is in the excessive power generation state. In this case, in S12, control circuit 7 calculates differential power ΔP based on frequency change amount Δf, and controls bidirectional chopper 5 such that DC power Pb corresponding to calculated differential power ΔP is charged into battery 22 (see FIG. 6).

In S12, control circuit 7 generates current command value Ib* such that DC current Ib becomes equal to reference DC current Ibr calculated from differential power ΔP. Then, control circuit 7 turns on and off IGBTs Q1 and Q4 of bidirectional chopper 5 in accordance with gate signal S1 having the same waveform as that of PWM signal ϕ1B generated based on current command value Ib*. As a result, DC power Pb corresponding to differential power ΔP is supplied to battery 22. Since DC power Pb corresponding to differential power ΔP is stored in battery 22, AC power Ps supplied from power system 20 to UPS 100 increases by the amount corresponding to differential power ΔP. As a result, the excessive power generation in power system 20 is eliminated and the increase in system frequency f is compensated.

While the frequency compensation is being performed in S11 and S12, control circuit 7 determines whether or not the SOC of battery 22 is equal to or more than Sth and equal to or less than Smax in S13. When SOC<Sth, or when SOC>Smax (determination of NO is made in S13), control circuit 7 stops the process for frequency compensation in S14.

As described above, the UPS according to the present embodiment can adjust the demanded power in power system 20 by charging or discharging battery 22 when power system 20 is normal. Thus, when there is an imbalance between the generated power and the demanded power due to fluctuations in outputs of distributed power supplies 26 and the like, fluctuations in system frequency can be compensated by utilizing battery 22 for power failure compensation.

Modification

Figure 13:
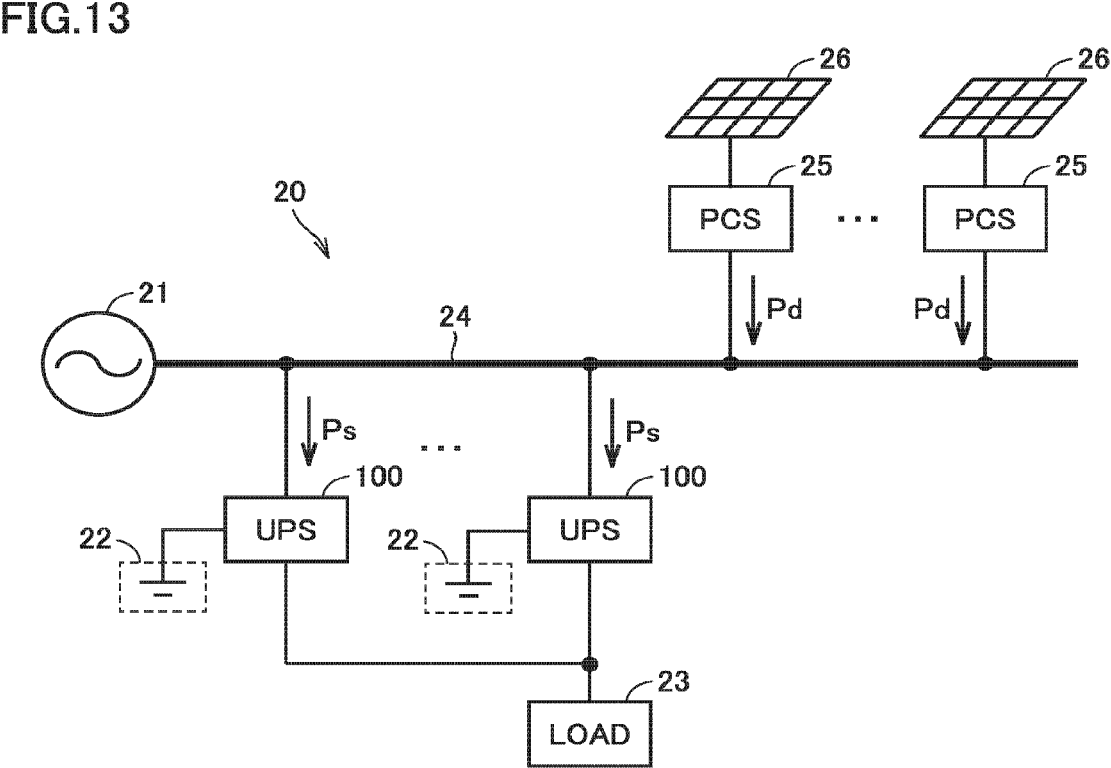
FIG. 13 shows a modification of the power system to which the uninterruptible power supply according to the present embodiment is applied.

In the above-described embodiment, the frequency compensation method in power system 20 to which one UPS is connected has been described. However, as shown in FIG. 13, the frequency compensation method according to the present embodiment is also applicable to a power system to which a plurality of UPSs are connected.

For example, in a large-scale data center, a plurality of UPSs are connected in parallel, to thereby implement a large-capacity UPS system having redundancy. By applying UPS 100 according to the present embodiment to each UPS in such a UPS system, the plurality of UPSs as a whole can provide a large capacity, even if one UPS can only provide a capacity of several hundreds of kVA for compensation for fluctuations in system frequency. Thus, even when the fluctuations in system frequency increases with the expansion of introduction of distributed power supplies 26, the fluctuations in system frequency can be compensated in the entire UPS system.

It should be understood that the embodiment disclosed herein is illustrative and non-restrictive in every respect. The technical scope of the present disclosure is defined by the terms of the claims, rather than the description above, and is intended to include any modifications within the scope and meaning equivalent to the terms of the claims.

Reference Signs List 1 power conversion device; 2, 6, 9 current detector; 3 converter; 4 control circuit; 5 bidirectional chopper; 8 inverter; 10, X1, X2 reactor; 11, C1, C2 capacitor; 12, 13 electromagnetic contactor; 20 power system; 21 commercial AC power supply; 22 battery (power storage device); 23 load; 24 power transmission line; 25 PCS; 26 distributed power supply; 30 frequency detector; 31 controller; 32, 34, 36 voltage detector; 40, 46, 52, 62 subtractor; 42, 88 multiplier; 44 divider; 48 current control unit; 50, 60 reference voltage generation unit; 54, 64 voltage control unit; 70 frequency compensation unit; 72 charging control unit; 74 discharging control unit; 76 SOC calculation unit; 78 power failure detector; 80 PWM control unit; 82 to 85 comparator; 86 selector; 87 signal output circuit; 100 UPS; 200 CPU; 202 memory; 204 I/O circuit; 206 bus; L1 to L3 DC line; Q1 to Q4 IGBT; D1 to D4 diode.

The invention claimed is:

1. An uninterruptible power supply comprising:
a power conversion device connected between a power system and a load;
a frequency detector that detects a system frequency, the system frequency being a frequency of an AC voltage on the power system; and
a controller that controls the power conversion device, wherein
the power conversion device includes:
a converter that converts AC power supplied from the power system into DC power;
an inverter that converts DC power supplied from the converter or a power storage device into AC power and supplies the AC power to the load; and
a bidirectional chopper that selectively performs a charging operation and a discharging operation, the charging operation being an operation in which a part of the DC power generated by the converter is stored in the power storage device, the discharging operation being an operation in which the DC power of the power storage device is supplied to the inverter,
the controller includes a control circuit that controls the bidirectional chopper to perform the discharging operation when a power failure of the power system occurs, and controls the bidirectional chopper based on the detected system frequency when the power system is normal, wherein
(1) when the power system is normal and when an amount of power storage in the power storage device is less than a threshold value, the control circuit controls the bidirectional chopper to control the charging operation until the amount of the power storage reaches the threshold value and then stops the charging operation,
(2) when the power system is normal, when the amount of power storage is equal to or more than the threshold value and when the system frequency increases, the control circuit controls the bidirectional chopper to perform the charging operation, and
(3) when the power system is normal, when the amount of power storage is equal to or more than the threshold value and when the system frequency decreases, the control circuit controls the bidirectional chopper to perform the discharging operation.

2. The uninterruptible power supply according to claim 1, wherein
the control circuit includes:
a frequency change calculation circuit that calculates an amount of change in the system frequency;
a computation circuit that calculates differential power based on the calculated amount of change, by referring to a preliminarily obtained relationship between the differential power and the amount of change, the differential power being a difference between generated power and demanded power in the power system; and
control circuitry that controls the charging operation and the discharging operation in accordance with the calculated differential power,
when the amount of change has a polarity indicating the increase in the system frequency, the control circuitry controls the charging operation such that DC power corresponding to the differential power is stored in the power storage device, and
when the amount of change has a polarity indicating the decrease in the system frequency, the control circuitry controls the discharging operation such that the DC power corresponding to the differential power is supplied from the power storage device.

3. The uninterruptible power supply according to claim 2, wherein
when the amount of power storage becomes less than the threshold value while the discharging operation is being performed in accordance with the differential power, the control circuitry stops the discharging operation.

4. The uninterruptible power supply according to claim 2, wherein
when the amount of power storage exceeds an upper limit value while the charging operation is being performed in accordance with the differential power, the control circuitry stops the charging operation.

5. The uninterruptible power supply according to claim 2, wherein
the control circuit further includes an amount-of-power-storage calculation circuit that calculates the amount of power storage in the power storage device, and
when the calculated amount of power storage is equal to or more than the threshold value, the control circuitry controls the charging operation and the discharging operation in accordance with the differential power.

6. The uninterruptible power supply according to claim 1, wherein
an amount of charging in the power storage device is divided into an amount of charging for power failure compensation and an amount of charging for frequency compensation by the threshold value,
the amount of charging for power failure compensation refers to an amount of charging required to continue to supply the DC power from the power storage device to the load for at least a predetermined time period when a power failure of the power system occurs, and
the amount of charging for frequency compensation refers to an amount of charging used to discharge the DC power from the power storage device in order to compensate for a decrease in the system frequency, or used to charge the DC power into the power storage device in order to compensate for an increase in the system frequency.

* * * * *